United States Patent [19]

MacDowell

[11] 4,341,872
[45] Jul. 27, 1982

[54] MICROWAVE-COMPATIBLE NEPHELINE GLASS-CERAMICS

[75] Inventor: John F. MacDowell, Painted Post, N.Y.

[73] Assignee: Corning Glass Works, Corning, N.Y.

[21] Appl. No.: 270,870

[22] Filed: Jun. 5, 1981

[51] Int. Cl.$^3$ .................................................. C03C 3/22
[52] U.S. Cl. .................................................. 501/6
[58] Field of Search .......................................... 501/6

[56] References Cited

U.S. PATENT DOCUMENTS

| | | | |
|---|---|---|---|
| 3,146,114 | 8/1964 | Kivlighn | 501/6 |
| 3,201,266 | 8/1965 | MacDowell | 501/6 |
| 3,313,609 | 4/1967 | Megles | 501/6 |
| 3,528,828 | 9/1970 | Smith | 501/6 |
| 3,573,072 | 3/1971 | Duke et al. | 501/6 |
| 3,653,865 | 4/1972 | Megles | 501/8 |
| 3,720,526 | 3/1973 | Duke et al. | 501/6 |
| 3,849,097 | 11/1974 | Giffen et al. | 501/6 |
| 4,022,627 | 5/1977 | Tashiro et al. | 501/6 |

Primary Examiner—Mark Bell
Attorney, Agent, or Firm—Clinton S. Janes, Jr.; Milton M. Peterson

[57] ABSTRACT

There are disclosed glass-ceramic materials characterized by a nepheline crystal phase and optionally having a secondary celsian or hexacelsian crystal phase. In addition to the $SiO_2$, $Al_2O_3$, $Na_2O$, and $TiO_2$ as a nucleating agent, the materials contain $K_2O$ and/or $Li_2O$ in limited amount, and preferably also contain BaO. These additives provide microwave compatibility, a thermal coefficient of expansion below $95 \times 10^{-7}/°C$., and suitability for application as glazed table or ovenware.

11 Claims, 5 Drawing Figures

MICROWAVE-COMPATIBLE NEPHELINE GLASS-CERAMICS

BACKGROUND OF THE INVENTION

This invention concerns glass-ceramic materials characterized by a nepheline crystal phase and by a low susceptibility to heating in a microwave field. It is particularly concerned with such materials possessing these and other characteristics to a sufficient extent that they are useful in dinnerware products.

A glass-ceramic (semicrystalline) material is a material, initially produced as a glass, in which a substantial portion of the glass has been crystallized in a controlled uniform manner. It is customarily produced by thermally treating a selected glass to grow crystals on nuclei formed from a nucleating agent included in the glass melt.

Glass-ceramic materials have found widespread product application ranging from missile nose cones to cooking surfaces. However, a major commercial impact has been in the housewares field, in particular, cookware and tableware.

My U.S. Pat. No. 3,201,266, granted Aug. 17, 1966, describes a narrow glass composition range in the $Na_2O.BaO.Al_2O_3.SiO_2.TiO_2$ system. These glasses are capable of being thermally converted to glass-ceramics possessing a physical appearance and properties that render them eminently suitable for dinnerware.

The glass-ceramics are described as having a coefficient of thermal expansion in the range of $75.4–110.7\times10^{-7}/°C$ and a crystal phase consisting essentially of nepheline and a dimorph of $BaO.Al_2O_3.2SiO_2$ selected from the group consisting of celsian and hexacelsian. They are also described as having crystals less than 30 microns in diameter, an average inherent abraded MOR that is greater than 12,000 psi and that may be increased to greater than 30,000 psi by glazing, and a capability of withstanding thermal shock from 140° C. to 0° C. Further, these glass-ceramics may have a color and feel equivalent to fine china, and may be highly resistant to food staining and detergent attack.

The rapid rise in microwave food preparation has imposed certain new requirements on cookware and dinnerware to enable use in such heating units. A particularly important requirement is microwave compatibility, that is, low absorption of microwave energy and consequent low susceptibility of a dish to become unduly hot during use. Most glasses and glass-ceramics are quite satisfactory for microwave use. However, those disclosed in my patent mentioned earlier are unusual in that they are highly susceptible to excessive heating in a microwave field. Hence, they are not well-suited for such use. Inasmuch as these materials have excellent properties in many other respects, it would be desirable to correct this deficiency without loss of such other properties.

PURPOSE OF THE INVENTION

It is, then, a basic purpose of this invention to provide a family of nepheline glass-ceramic materials which are characterized by relatively low absorption of microwave energy. A further purpose is to provide such materials possessing microwave compatibility in combination with other characteristics particularly suited to cookware and tableware. Another purpose is to modify the glass-ceramic materials disclosed in U.S. Pat. No. 3,201,266 to improve their microwave compatibility while maintaining other properties equal to or superior to those described there. A particular purpose is to provide such materials having a thermal expansion coefficient not exceeding $95\times10^{-7}/°C$.

SUMMARY OF THE INVENTION

To these purposes, and others that will become apparent, my invention is a glass-ceramic body in which the primary crystalline phase is composed of nepheline crystals less than 20 microns in diameter, the body has a microwave compatibility of less than 150° C., and the composition of the body, in percent by weight as calculated on the oxide basis, consists essentially of 30–55% $SiO_2$, 28–38% $Al_2O_3$, 5–12% $TiO_2$ as nucleating agent, and 10–20% $R_2O$ ($Na_2O+K_2O+Li_2O$), each mole of $R_2O$ being composed of 0.65–0.95 moles $Na_2O$, 0–0.20 moles $K_2O$ and 0–0.15 moles $Li_2O$. Preferably, the body has a microwave compatibility below 100° C., and each mole of $R_2O$ contains 0.65–0.90 moles $Na_2O$.

A preferred embodiment of the invention is a glass-ceramic body in which the primary crystalline phase is composed of nepheline crystals and there is a secondary, celsian-type crystal phase with the crystals being not over about 20 microns in diameter, the article has a microwave compatibility of less than 100° C., and a coefficient of thermal expansion in the range of $80–95\times10^{-7}/°C$, and the composition of the body, in percent by weight as calculated on the oxide basis, consists essentially of 30–55% $SiO_2$, 28–38% $Al_2O_3$, 5–12% $TiO_2$ as nucleating agent, 1–10% $BaO$, 0–3% $K_2O$, 0–1½% $Li_2O$, 10–18% $Na_2O$, and 10–30% $R_2O$ ($Na_2O+K_2O+Li_2O$) plus $BaO$, each mole of $R_2O+BaO$ being composed of 0.50–0.80 moles $Na_2O$, 0–0.15 moles $Li_2O$, 0–0.20 moles $K_2O$, the total $Li_2O+K_2O$ being at least 0.10 moles, and 0.02–0.20 moles $BaO$. Preferably, the $R_2O$ content includes 0.05 moles each of $K_2O$ and $Li_2O$.

DESCRIPTION OF THE DRAWINGS

Each of the attached drawings, FIGS. 1–5, inclusive, is a graphical representation of changes in microwave compatibility achieved in accordance with the present invention.

LITERATURE

Figure 1:
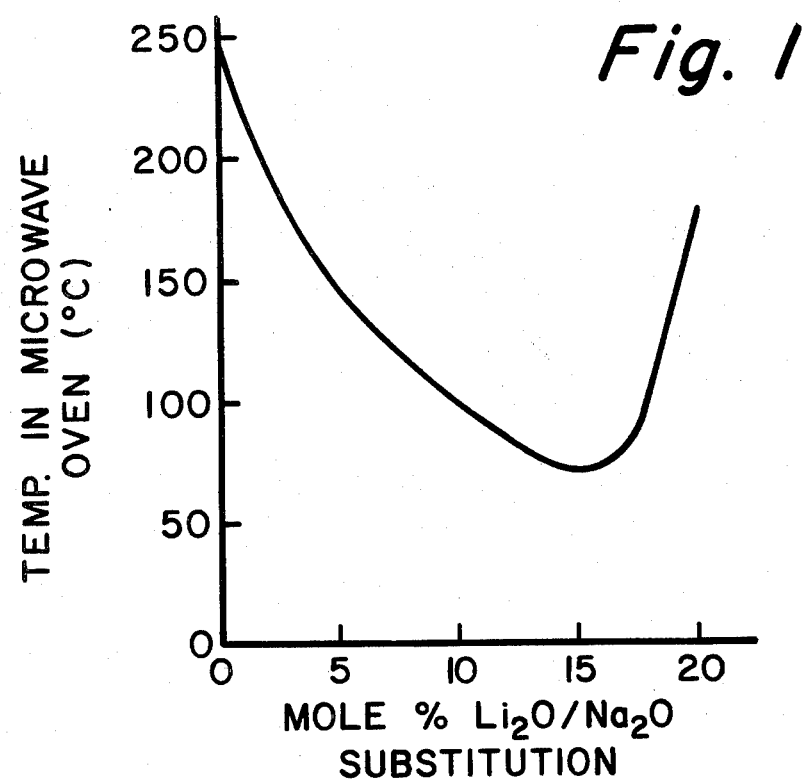
FIG. 1 illustrates the effect of $Li_2O$-for-$Na_2O$ substitution in a standard nepheline glass-ceramic.

My U.S. Pat. No. 3,201,266 has already been mentioned. It teaches heat treating glasses consisting essentially of $Na_2O$, $BaO$, $Al_2O_3$, $SiO_2$ and $TiO_2$ to produce glass-ceramics characterized by a crystal phase composed of nepheline and celsian or hexacelsian crystals, and described as particularly adapted to tableware production. No mention is made of additives or substituents other than a fining agent.

An earlier U.S. Pat. No. 3,146,114 to H. D. Kivlighn, discloses producing glass-ceramics having a nepheline crystal phase with or without a minor plagioclase phase.

The patent teaches the need of a nucleating agent having an ilmenite structure, specifically a metal titanate or chrome oxide ($Cr_2O_3$). Titania is said to be ineffective. With respect to additives, the patent states that $K_2O$ may be included in small amount "without objectionably affecting the process or product", but "the presence of substantial $Li_2O$ in the compositions is undesirable because it causes other phases to crystallize".

U.S. Pat. No. 3,528,828 to W. E. Smith, in essence, excludes the Kivlighn compositions and teaches, in contrast, that nepheline glass-ceramics can be produced employing titania ($TiO_2$) as a nucleating agent. It refers to $K_2O$ as an optional ingredient in amounts up to 3%, but ascribes no change in properties, or purpose, to its presence.

U.S. Pat. No. 4,022,627 to M. Tashiro et al. teaches the use of $ZrO_2$ plus ZnO as a nucleating agent to produce nepheline glass-ceramics useful for kitchen or table ware. Several optional additives, in minor amount, are mentioned, including $K_2O$ and $Li_2O$, but no purpose is disclosed for either of those oxides.

A method of heat treating glasses containing 1-3% MgO, in addition to $Na_2O$, $Al_2O_3$, $SiO_2$ and $TiO_2$, to produce exceptionally high strength nepheline glass-ceramics, is disclosed in U.S. Pat. No. 3,313,609 to J. E. Megles.

U.S. Pat. No. 3,653,865, also to J. E. Megles, disclosed fine-grained, nepheline glass-ceramics having high mechanical strength due to a carefully controlled ceramming schedule. These materials must contain lime and magnesia as additives. Several optional ingredients are mentioned, but neither purpose nor effect is detailed.

U.S. Pat. No. 3,720,526, to D. A. Duke and myself, discloses fine-grained, strong glass-ceramics capable of being glazed and having a nepheline or nephelinekaliophilite solid solution crystal phase. These are nucleated by $TiO_2$, $ZrO_2$ and/or $SnO_2$ and contain $Na_2O$ or $Na_2O$-$K_2O$ as the alkali content depending on the desired crystal phase.

GENERAL DESCRIPTION

It was recognized that simple ternary nepheline glass-ceramics, that is composed of $Na_2O$, $Al_2O_3$, and $SiO_2$ and containing $TiO_2$ as a nucleant, had several properties that severely limited their use, especially as dinnerware. Thus, they were highly susceptible to heat shock due to high thermal coefficients of expansion ($115-130 \times 10^{-7}/°C.$), and also tended to distort during the ceram and/or subsequent glazing cycles.

The addition of barium oxide (BaO) for $Na_2O$, as described in U.S. Pat. No. 3,201,266, remedied these deficiencies, but made no improvement on microwave compatibility. Thus, with or without the BaO additive, and consequent development of a celsian-type crystal phase, the materials still attained temperatures on the order of 200°-250° C. in a standard compatibility test as described later. These values were well above that desired. Therefore, initial efforts were to replace BaO with another additive or additive combination.

It was found that $Li_2O$ substitutions for $Na_2O$ of less than 15 mole % in $Na_2O$-$Al_2O_3$-$SiO_2$ glass-ceramics produced the following unexpected effects: (1) substantially lowered expansions, (2) increased microwave compatibilities, (3) decreased grain size (increased nucleation efficiencies) and (4) no new crystalline or glassy phases (indicating direct substitution of $Li_2O$ for $Na_2O$ in the nepheline structure). As anticipated, a favorable effect on liquidus values was also found.

FIG. 1 of the drawing illustrates the effect that lithia ($Li_2O$) substitution for soda ($Na_2O$) has on the microwave compatibility of nepheline type glass-ceramics. In FIG. 1, temperature (TEMP.), in °C., of a glass-ceramic sample, after a standard treatment in a microwave oven, is plotted along the vertical axis. Mole percent substitution of $Li_2O$ for $Na_2O$ is plotted along the horizontal axis.

It will be noted that, molar composition values and changes are employed in FIG. 1, as well as the other figures, for comparative purposes. Thus, a $Na_2O.Al_2O_3.SiO_2.TiO_2$ composition was selected having a molar ratio of approximately 1.0:1.1:2.5:0.25. Thereafter, all compositions corresponded on a molar basis, except that substitutions of lithia for soda were made as indicated, the total moles of $Li_2O + Na_2O$ being held at unity. The large divergence between $Li_2O$, $Na_2O$ and $K_2O$ molecular weights necessitates this expedient for meaningful comparisons.

It will be observed that $Li_2O$ has a pronounced effect with the temperature being reduced from 250° C. to below 150° C. at a 5 mole percent substitution. From 5 to 15 mole % the effect is less dramatic, but there is a steady decrease to a value of about 70°-75° C. When lithia substitutions for soda exceeded 15 mole %, the glass-ceramics produced were rather coarse-grained, weak and porous. Microwave values reversed and rose rapidly, and spodumene emerged as a significant crystal phase.

The substitution of 15 mole percent $Li_2O$ for $Na_2O$ provides an attractive degree of microwave compatibility. At the same time, it reduces the high temperature viscosity of the cerammed glass to a point where the material tends to sag and distort during subsequent glazing. Also, with this high $Li_2O$ level, there is an increased tendency for the material to crack during ceramming. Thus, these adverse effects tend to limit the areas in which the material may be used.

Figure 2:
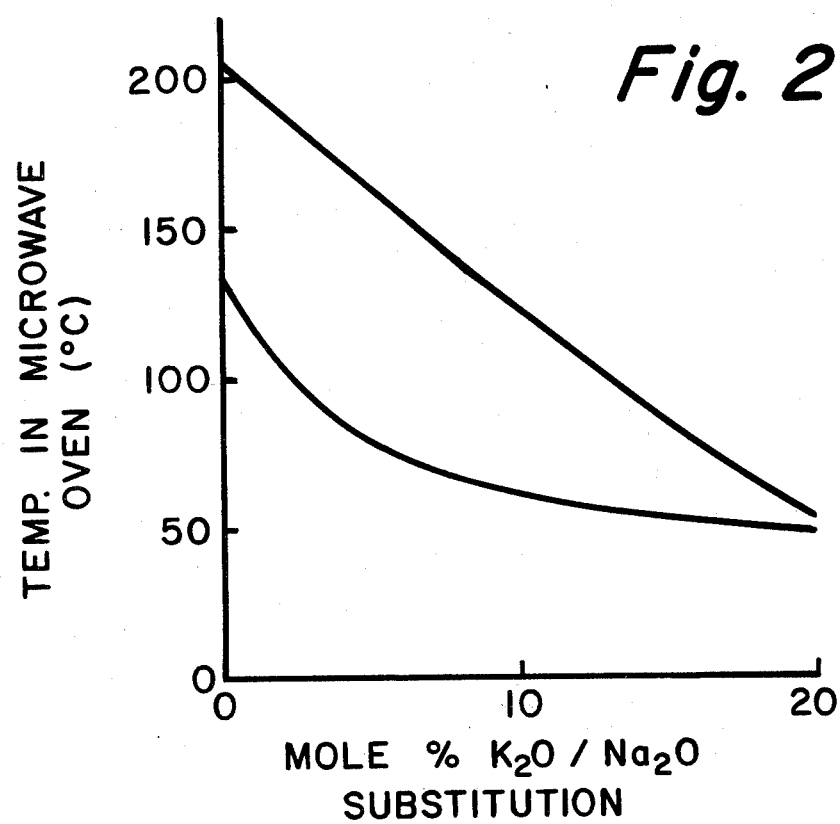
FIG. 2 illustrates a similar effect from $K_2O$-for-$Na_2O$ substitution.

FIG. 2 illustrates the positive effect of potassia ($K_2O$) substitutions for soda ($Na_2O$). The compositions illustrated in this figure, like those in FIG. 1, are based on a standard $Na_2O.Al_2O_3.SiO_2.TiO_2$ composition. In this case, the fixed molecular formula approximated 1.0:1.0:2.5:0.25. Substitutions of $K_2O$ for $Na_2O$ were made on a molar basis in the same manner as with $Li_2O$. As in FIG. 1, microwave compatibility temperatures are plotted on the vertical axis and mole percent substitutions on the horizontal axis.

As FIG. 2 shows, $K_2O$ substitutions for $Na_2O$, at least up to 20 mole percent, have a positive effect on microwave compatibility similar to that illustrated for $Li_2O$ in FIG. 1. Unfortunately, however, the substitution of $K_2O$ caused an equally dramatic rise in thermal coefficient of expansion and consequent loss of heat shock resistance.

For applications where heat shock is especially significant, the thermal expansion effect can be counteracted to some extent by substituting a combination of $K_2O$ and $Li_2O$ for $Na_2O$. This combination also reduces the cracking tendency encountered with $Li_2O$ substitutions. Such combination substitutions are illustrated by the lower curve in FIG. 2. The series of glasses represented by this curved used a standard molecular composition wherein 10% $Na_2O$ was replaced by $Li_2O$. Then further replacements of $Na_2O$ by $K_2O$, up to 20 mole percent, were made to provide the series for comparison. Nevertheless, even with the Li$_2$O substitutions, it still proved difficult to keep the thermal expansion below 100×10$^{-7}$/°C.

Further study revealed that the desirable effect of barium oxide in lowering thermal expansion coefficient could be achieved in the new mixed alkali glasses. Of even greater significance, this highly desirable result did not require any sacrifice of microwave compatibility.

Figure 3:
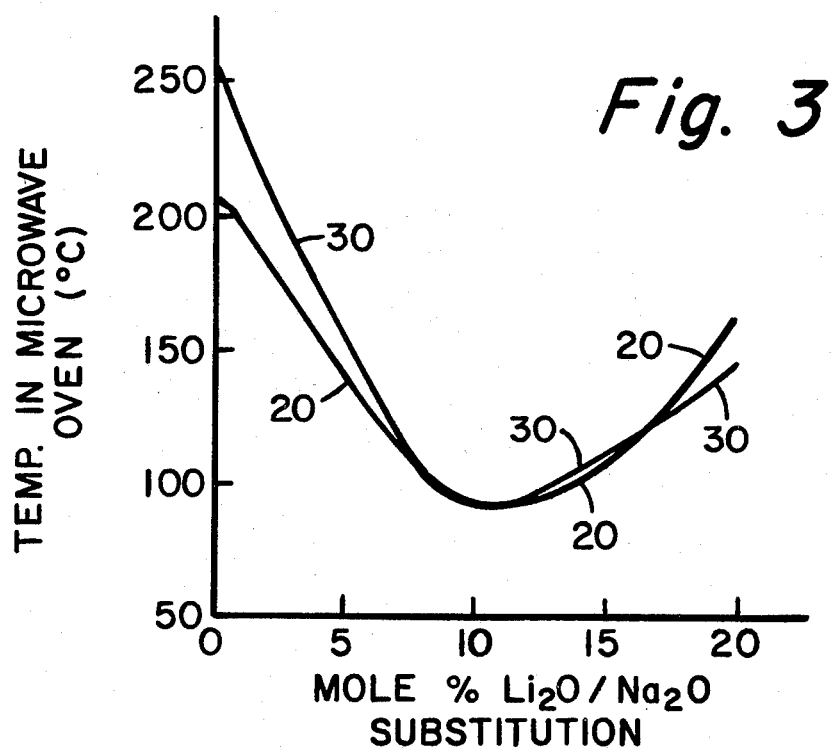
FIG. 3 illustrates the effect of $Li_2O$-for-$Na_2O$ substitution in a standard nepheline-celsian glass-ceramic.
Figure 4:
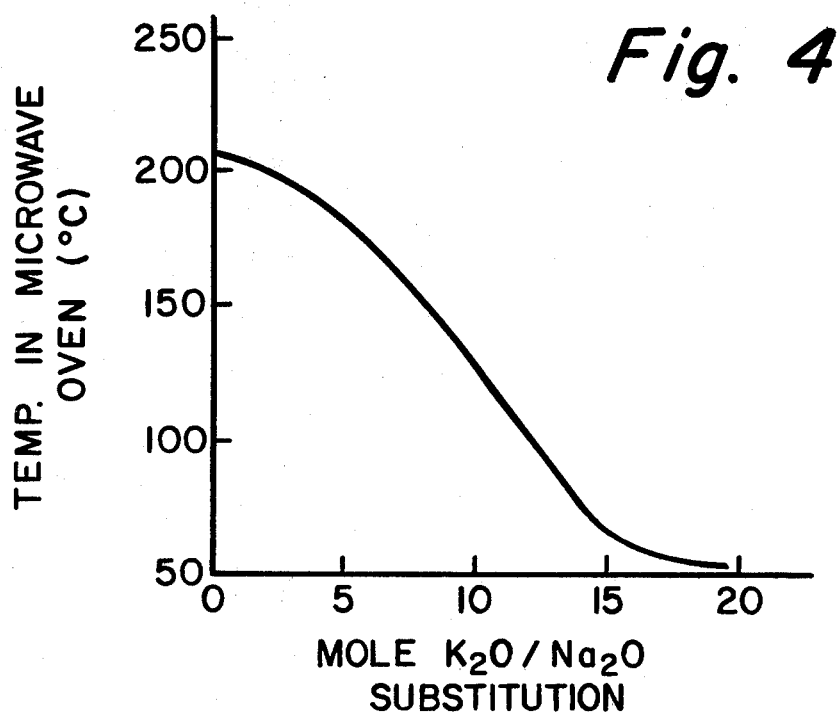
FIG. 4 illustrates a similar effect from $K_2O$-for-$Na_2O$ substitution.
Figure 5:
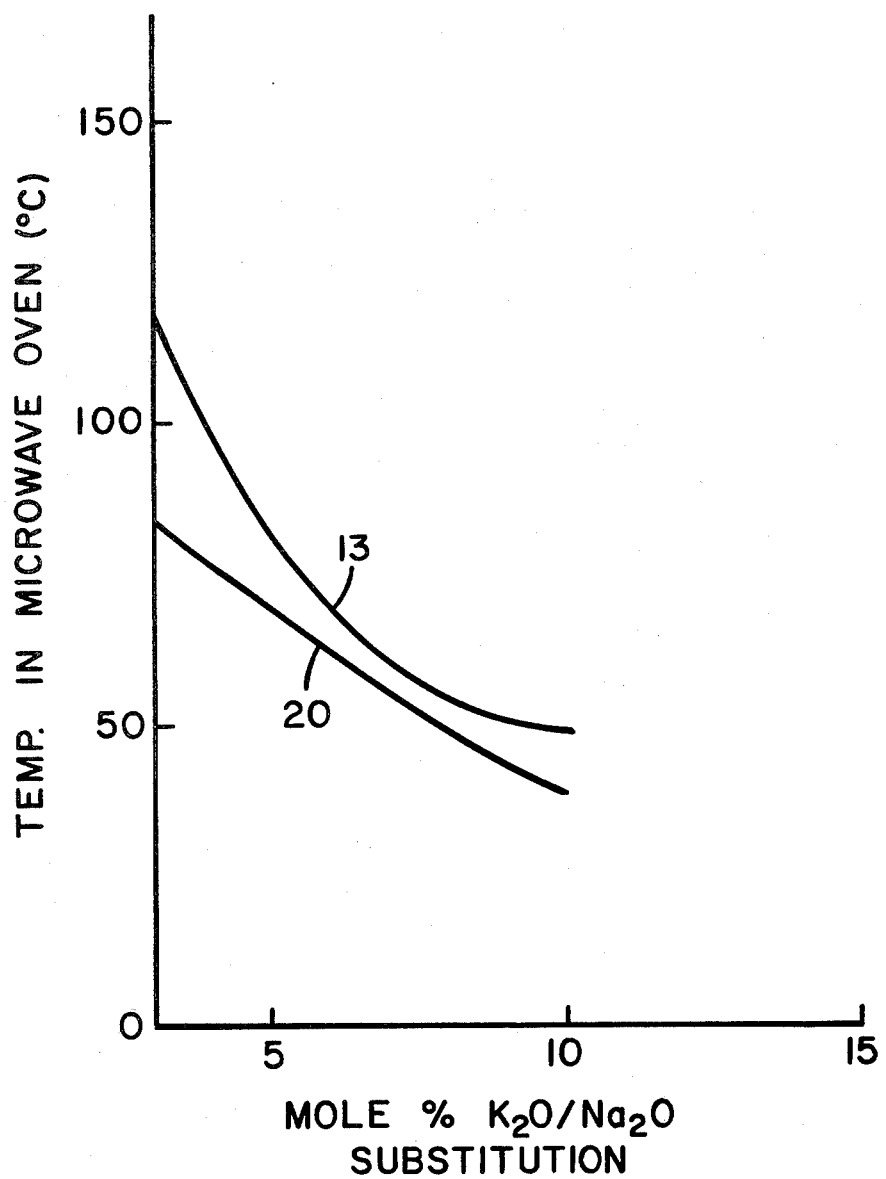
FIG. 5 illustrates the effect of substituting $Li_2O$ and $K_2O$, in combination, for $Na_2O$ in a standard nepheline-celsian glass-ceramic.

FIGS. 3–5, inclusive, are graphical illustrations, similar to those of FIGS. 1 and 2. They demonstrate that substitutions of Li$_2$O and/or K$_2$O for Na$_2$O in baria (BaO) containing nepheline glass-ceramics are equally as influential on microwave compatibility as in non-baria compositions. Thus, the substitution of at least 5% K$_2$O or Li$_2$O for Na$_2$O in either a nepheline or a nepheline-celsian material imparts a microwave compatibility of 150° C. or below. In turn a 10–15% substitution effects a reduction to 100° or less temperature on test. The development of a secondary celsian-type crystal phase, while highly effective in controlling expansion coefficient, has little apparent effect, either negative or positive, on microwave compatibility.

FIG. 3 is based on a standard Na$_2$O.Al$_2$O$_3$.SiO$_2$.TiO$_2$ composition having a molar ratio approximating 1.0:1.1:2.5:0.4. In this composition two levels of BaO-for-Na$_2$O substitution were made. The curve designated "30" represents compositions having a 30 mole percent substitution of BaO for Na$_2$O plus varying substitutions of Li$_2$O for Na$_2$O as indicated along the horizontal axis. The curve designated "20" is similarly derived except that the BaO-for-Na$_2$O substitution is at the 20 mole percent level. Note that total moles of BaO+Na$_2$O +Li$_2$O is maintained at unity throughout the composition series.

FIG. 4 similarly illustrates the effect of K$_2$O-for-Na$_2$O substitutions on microwave compatibility. In this case, the Na$_2$O.BaO.Al$_2$O$_3$.SiO$_2$ composition has a molar ratio of 1.0:1.13:2.66:0.3, and the BaO-for-Na$_2$O substitution level is 20 mole percent. It may be noted that a K$_2$O-for-Na$_2$O substitution of about 15 mole percent produces optimum microwave compatibility. However, a BaO substitution over 20 mole percent is necessary to control thermal expansion. The resulting deep blue color and large grain size, as well as high glass liquidus, make such compositions less desirable for dinnerware applications.

FIG. 5 illustrates the effect of K$_2$O-for-Na$_2$O mole percent substitutions in two standard compositions, each having a molecular formula approximating 1:1:2.5:0.7. One has a 13 mole percent substitution of BaO for Na$_2$O (the upper curve), the other a 20 mole percent substitution (the lower curve). Both have a nine (9) mole percent Li$_2$O-for-Na$_2$O substitution. In all cases, the total BaO+Na$_2$O+K$_2$O +Li$_2$O is unity.

The combination of Li$_2$O and K$_2$O produces an effect greater than either alone. Further, thermal expansion coefficients well below 100×10$^{-7}$/° C. and other desired properties for tableware are attained.

In order to obtain the several advantageous features of the invention, compositional limits must be carefully observed. Titania (TiO$_2$) functions as a nucleating agent to provide crystallization of controlled grain size. The presence of adequate alumina (Al$_2$O$_3$) is also essential for effective nucleation and crystal control. Thus, at least 5% TiO$_2$ and at least 28% Al$_2$O$_3$ are necessary for effective nucleation and crystal growth. Larger amounts of TiO$_2$ tend to cause spontaneous opalization and possible devitrification. Hence, the TiO$_2$ must not exceed 12%, is preferably not over 7%, and optimally is in the 6–6.5% range. Increased concentrations of alumina rapidly raise liquidus temperatures and should not exceed 38%, preferably not over 33%, for this reason.

Soda (Na$_2$O), Al$_2$O$_3$ and silica (SiO$_2$) are essential components of the nepheline crystal phase. Lithia (Li$_2$O) and potassia (K$_2$O) markedly increase the microwave compatibility of nepheline glass-ceramics, that is, they reduce the energy absorption and consequent temperature rise under a standard exposure.

Li$_2$O lowers the thermal expansion coefficient, apparently by substituting for Na$_2$O in the nepheline crystal lattice. K$_2$O, in contrast, raises the coefficient and appears to form part of the glassy phase rather than substituting in the crystal. Hence, where the expansion coefficient must be controlled to provide greater heat shock resistance, Li$_2$O and K$_2$O should be used in conjunction.

As explained above, the Li$_2$O and K$_2$O contents are related to the total content of Na$_2$O+Li$_2$O+K$_2$O on a molar basis. As a general rule, the total of these three oxides should be in the range of 10–20% by weight, the Li$_2$O should not exceed 1½% and the K$_2$O not over 3%, all in percent by weight of the total composition.

Baria (BaO) functions essentially as it does in earlier all-soda compositions to provide a low expansion crystal phase, celsian. Again, it tends to function as a soda substituent, and its content is related thereto on a molar basis. However, the total BaO content in percent by weight should not exceed about 10% by weight if the desired crystal phase relationship and grain size are to be achieved.

Calcia (CaO) in small amounts may enter the nepheline lattice and lower the expansion coefficient somewhat. However, it tends to cause considerable sag during ceramming and/or glazing cycles and is generally avoided.

Arsenic oxide in amounts up to one percent may be effectively employed as a glass fining agent.

In carrying out the invention, a glass batch is formulated, the several ingredients mixed to form the batch, and the batch introduced into a melting unit adapted to operate in the vicinity of 1600° C. After a suitable melting period, glass is withdrawn from the unit and formed to desired shape by conventional processes such as drawing, rolling, pressing and blowing.

The glassware thus formed is then converted to the glass-ceramic state by heat treatment to cause uniform and substantial crystallization of the glass. The heat treating schedule may vary within rather wide ranges of time, temperature and rate in known manner. It may be tailored to a particular composition and/or to the particular crystal content and size desired. However, a typical schedule used for present nepheline and nepheline-celsian materials is as follows:

Heat at 300°/hour to 750° C.
Heat at 50°/hour from 750° C. to 850° C.
Heat at 300°/hour from 850° C. to 1050° C.
Heat at 1050° C. for 2 hours
Cool at furnace rate.

In a broad region of the Na$_2$O-Al$_2$O$_3$-SiO$_2$-TiO$_2$ system, the first major crystalline phase to appear upon reheating is carnegieite (Na$_2$O-Al$_2$O$_3$-2SiO$_2$). Presumably, it is the beta- or high temperature form, although it is detected as the alpha form in X-ray diffraction studies at room temperature. This phase grows in the glass as radial spherulites that appear between 750° and 850° C. and probably grow on anatase nuclei.

Between 950° and 1000° C., the carnegieite undergoes a dramatic and complete recrystallization into a regular array of euhedrally-shaped nepheline crystals with square or hexagonal outlines. Crystal size can vary from about 0.1 micron to over ten microns, depending upon the efficiency of nucleation and the hold time at maximum temperature. Both the carnegieite and the nepheline phases are believed to represent $Na_2O.Al_2O_3.2SiO_2$ stoichiometries, although limited solid solution may occur.

Adding BaO to this system injects the orthorhombic celsian phase ($BaO.Al_2O_3.3SiO_2$) into the sequence just before the carnegieite transforms to nepheline. Thus, the celsian phase appears at around 930°–950° C.

Once crystallization is completed to the desired degree, the article may be cooled as rapidly as compatible with noncracking. With most ware, this can be accomplished by simply shutting off the furnace or kiln.

SPECIFIC DESCRIPTION

The invention is further described with respect to numerous specific examples. The compositions shown in the tables that follow are calculated, in parts by weight (which approximate weight percent) on the oxide basis, from actual batch compositions formulated and mixed for melting. Batch materials employed, and the equivalent oxide calculated therefrom, are shown in the following listing:

| Batch Material | Oxide |
|---|---|
| 200 Mesh Supersil Sand | $SiO_2$ |
| Alcoa Alumina | $Al_2O_3$ |
| Soda Ash | $Na_2O$ |
| Chilean Sodium Nitrate | $Na_2O$ |
| Lithium Carbonate (Foote) | $Li_2O$ |
| Potassium Carbonate, Dry (Hooker) | $K_2O$ |
| Barium Carbonate | BaO |
| Calcium Carbonate (Brazilian) | CaO |
| Titanium Dioxide | $TiO_2$ |
| Arsenic Trioxide | $As_2O_3$ |

It will be apparent that other raw materials might be used to the extent impurities are tolerable. For example, it is contemplated $Na_2O$, $Al_2O_3$ and $SiO_2$ might be supplied in part at least by the mineral nepheline syenite.

Batch compositions were melted in 500 cc platinum crucibles at 1600° C. for from 4 to 16 hours in electric furnaces. Where excellent glass quality was desired, the batches were ballmilled dry and/or the melts were stirred after overnight melting.

One five-foot cane (about $\frac{1}{8}''$ to $\frac{1}{4}''$ in diameter) and one $4''\times 8''\times \frac{3}{8}''$ (approximately) rolled patty were made from each melt. The rolled patties were annealed at 700° C. for about one hour and then cooled slowly to room temperature.

The cane was cut into 5" lengths and cerammed. The most common schedule employed was:
300°/hr. to 750° C.,
50°/hr. from 750° to 850° C.,
300°/hr. from 850° to 1050° C.,
hold at 1050° C. for 2 hours,
cool at furnace rate.

Distortion during ceramming was routinely determined by measuring the amount of sag (in mm) across a 4" section of $\frac{1}{8}''$ to $\frac{1}{4}''$ diameter cane. A value less than 20 mm. is generally considered desirable. Properties of interest where determined on glass samples that appeared fine grained, nonporous, and of uniform quality after crystallization.

In addition to ceramming distortion, certain other properties and/or characteristics determined or measured are shown in conjunction with the compositions. The terms employed are explained as follows:

Microwave compatibility was determined by measuring the maximum temperature reached by a glass-ceramic sample after it was exposed to microwave radiation for five (5) minutes in 650 watt microwave oven (Sharp Model No. R-2120) at full power with a 500 c.c. water load. The samples employed were approximately $4''\times 8''\times \frac{1}{4}''$ ($10\times 20\times 0.6$ cm.).

Thermal expansion coefficient (Exp.) is the average expansion occurring per unit length per ° C. between 0° and 300° C. as a cane is heated in accordance with a standard procedure.

Crystal phases present are the principal phases observed, after ceramming, on a powdered sample by X-ray diffraction. In addition, minor amounts of rutile or anatase were usually present. The phases are identified as shown:
N—nepheline
C—celsian
H—hexacelsian
S—beta-spodumene Average crystal grain size was estimated by observation through an optical microscope and classified according to the following categorization:
vf=very fine=up to 1 micron.
f=fine=1 to 2 microns.
mf=medium fine=2 to 10 microns.
m=medium=10 to 20 microns.
c=coarse=over 20 microns.

Ceram cracking (c.c.) indicates the number of cracks observed in a $4''\times 8''\times \frac{1}{4}''$ ($10\times 20\times 0.6$ cm.) rolled patty after ceramming on a standard schedule. The categorization is:
OK=no cracks
X=one or two cracks
XX=several cracks
XXX=numerous cracks As indicated earlier, high temperature viscosity may be important for such applications as glazed dinnerware. Acceptable values are $10^{13}$ poises at 1030° C. and $10^{12}$ poises at 1085° C.

The examples are arranged in tables corresponding generally, in terms of composition, to the several figures in the drawing. Thus, all of the compositions include the basic-oxide ingredients, $SiO_2$, $Al_2O_3$, $Na_2O$, $TiO_2$ (nucleant) and $As_2O_3$ (fining agent). In addition, Table I shows $Li_2O$ substitutions; Table II shows $K_2O$ and $K_2O$-$Li_2O$ substitutions; Table III shows $Li_2O$-BaO substitutions; Table IV $K_2O$-BaO substitutions; Table V $Li_2O$-$K_2O$-BaO substitutions; Table VI $Li_2O$-$K_2O$-BaO and $Li_2O$-$K_2O$-BaO-CaO substitutions.

TABLE I

|  | 1 | 2 | 3 | 4 | 5 | 6 | 7 | 8 | 9 | 10 |
|---|---|---|---|---|---|---|---|---|---|---|
| $SiO_2$ | 44.0 | 46.3 | 46.4 | 44.4 | 46.3 | 43.6 | 46.5 | 45.9 | 44.6 | 44.9 |
| $Al_2O_3$ | 31.3 | 30.0 | 30.1 | 31.6 | 30.1 | 32.7 | 30.2 | 31.2 | 31.8 | 31.9 |
| $Na_2O$ | 18.2 | 17.0 | 16.4 | 16.6 | 16.7 | 16.3 | 16.1 | 15.6 | 15.7 | 14.9 |

TABLE I-continued

|  | 1 | 2 | 3 | 4 | 5 | 6 | 7 | 8 | 9 | 10 |
|---|---|---|---|---|---|---|---|---|---|---|
| $Li_2O$ | — | 0.17 | 0.51 | 0.9 | 0.34 | 0.9 | 0.68 | 0.8 | 1.4 | 1.8 |
| $TiO_2$ | 6.0 | 6.0 | 6.0 | 6.0 | 6.0 | 6.0 | 6.0 | 6.0 | 6.0 | 6.0 |
| $As_2O_3$ | 0.5 | 0.5 | 0.5 | 0.5 | 0.5 | 0.5 | 0.5 | 0.5 | 0.5 | 0.5 |
| Microwave Heatup | 205 | 181 | 131 | 136 | 123 | 120 | 104 | 84 | 67 | 152 |
| Thermal Expansion | 121.9 | 116.0 | 104.3 | 85.2 | 109.0 | 85.2 | 99.3 | 88.5 | 68.8 | 100.5 |
| Ceram Distortion | 7 | 9 | 11 | 3 | 11 | 3 | 11 | 7.5 | 6 | 6 |
| Grain Size | f-m | f-m | m-f | f | m-f | f | m-f | m-f | f | m-f |
| Ceram Cracking | xx | xx | x | xx | x | xxx | x | ok | xxx | — |
| Crystal Phase | N | N | N | N | N | N | N | N | N | N,(B-S) |

TABLE II

|  | 1 | 2 | 3 | 4 | 5 | 6 | 7 | 8 |
|---|---|---|---|---|---|---|---|---|
| $SiO_2$ | 43.45 | 43.1 | 44.4 | 44.1 | 44.1 | 44.1 | 44.1 | 45.2 |
| $Al_2O_3$ | 31.0 | 30.7 | 31.7 | 31.5 | 31.5 | 31.5 | 31.5 | 30.7 |
| $Na_2O$ | 16.2 | 14.2 | 16.5 | 15.7 | 15.3 | 14.9 | 14.5 | 12.8 |
| $Li_2O$ | — | — | 0.90 | 0.88 | 0.88 | 0.88 | 0.88 | 0.82 |
| $K_2O$ | 2.7 | 5.4 | — | 1.1 | 1.7 | 2.2 | 2.8 | 3.9 |
| $TiO_2$ | 6.0 | 6.0 | 6.0 | 6.0 | 6.0 | 6.0 | 6.0 | 6.0 |
| $As_2O_3$ | 0.5 | 0.5 | 0.5 | 0.5 | 0.5 | 0.5 | 0.5 | 0.5 |
| Microwave Heatup | 123 | 53 | 136 | 83 | 74 | 69 | 62 | 50 |
| Thermal Expansion | 128.3 | 129.8 | 85.2 | 92.2 | 96.5 | 100.9 | 103.4 | 109.0 |
| Ceram Distortion | 9.5 | 10.5 | 3 | 5 | 8 | 4 | 8 | 10 |
| Grain Size | f | f | f | f | f | f | f | vf |
| Ceram Cracking | xx | ok | — | xx | xx | xxx | xxx | ok |
| Crystal Phase | N | N | N | N | N | N | N | N |

TABLE III

|  | 1 | 2 | 3 | 4 | 5 | 6 | 7 | 8 |
|---|---|---|---|---|---|---|---|---|
| $SiO_2$ | 41.0 | 41.2 | 41.3 | 41.7 | 39.9 | 40.3 | 40.6 | 35.2 |
| $Al_2O_3$ | 30.6 | 30.7 | 30.9 | 31.2 | 29.8 | 30.1 | 30.3 | 32.9 |
| $Na_2O$ | 13.5 | 12.8 | 12.0 | 10.4 | 11.5 | 10.0 | 8.4 | 10.9 |
| $Li_2O$ | — | 0.41 | 0.83 | 1.67 | — | 0.81 | 1.63 | 0.88 |
| BaO | 8.5 | 8.5 | 8.5 | 8.5 | 12.3 | 12.3 | 12.3 | 13.5 |
| $TiO_2$ | 7.0 | 6.0 | 7.0 | 7.0 | 7.0 | 7.0 | 7.0 | 7.0 |
| $As_2O_3$ | 0.5 | 0.5 | 0.5 | 0.5 | 0.5 | 0.5 | 0.5 | 0.5 |
| Microwave Heatup | 207 | 144 | 99 | 164 | 254 | 88 | 147 | 121 |
| Thermal Expansion | 96.0 | — | 66.4 | — | 84.9 | — | — | 93.4 |
| Ceram Distortion | 14 | >20 | >20 | >20 | >20 | >20 | >20 | 9 |
| Grain Size | f-m | m | f | c | m | m-c | c | f |
| Ceram Cracking | — | ok | — | — | — | — | — | — |
| Crystal Phase | N,C | N,C | N,C | N,C | C,N | C,N | C,N | H,N |

TABLE IV

|  | 1 | 2 | 3 | 4 | 5 | 6 | 7 |
|---|---|---|---|---|---|---|---|
| $SiO_2$ | 41.5 | 40.7 | 40.6 | 40.6 | 40.3 | 39.8 | 39.2 |
| $Al_2O_3$ | 30.1 | 30.3 | 30.3 | 30.2 | 30.1 | 30.0 | 29.2 |
| $Na_2O$ | 12.9 | 12.2 | 11.7 | 11.4 | 10.9 | 10.0 | 8.2 |
| $K_2O$ | — | 2.1 | 2.5 | 3.0 | 3.8 | 3.8 | 4.9 |
| BaO | 8.0 | 8.3 | 8.3 | 8.3 | 8.3 | 10.2 | 12.0 |
| $TiO_2$ | 6.5 | 6.0 | 6.0 | 6.0 | 6.0 | 6.0 | 6.0 |
| $As_2O_3$ | 1.0 | .5 | .5 | .5 | .5 | .5 | .5 |
| Microwave Heatup | 205 | 164 | 120 | 117 | 66 | 60 | 58 |
| Thermal Expansion | — | 100.6 | 100.5 | 100.8 | 105.2 | 95.1 | — |
| Ceram Distortion | >20 | 12 | 11.5 | 13 | 15 | 17 | >20 |
| Grain Size | m | f-m | f-m | m-f | f-m | m | m-c |
| Ceram Cracking | — | x | — | — | — | ok | — |
| Crystal Phase | N | N,C | N,C | N,C | N,C,H | N,C | H,N,C |

TABLE V

|  | 1 | 2 | 3 | 4 | 5 | 6 | 7 | 8 | 9 | 10 |
|---|---|---|---|---|---|---|---|---|---|---|
| $SiO_2$ | 41.6 | 43.7 | 42.3 | 42.3 | 42.3 | 41.1 | 42.0 | 42.3 | 42.3 | 42.3 |
| $Al_2O_3$ | 31.0 | 29.7 | 30.2 | 30.2 | 30.2 | 30.7 | 31.0 | 30.2 | 30.2 | 30.2 |
| $Na_2O$ | 13.1 | 12.2 | 13.3 | 12.9 | 12.5 | 11.1 | 13.0 | 12.7 | 12.3 | 11.9 |
| $Li_2O$ | 0.25 | 0.24 | 0.42 | 0.42 | 0.42 | 0.41 | 0.5 | 0.76 | 0.76 | 0.76 |
| $K_2O$ | 2.1 | 2.5 | 1.6 | 2.1 | 2.65 | 3.9 | 1.5 | 1.6 | 2.1 | 2.65 |
| BaO | 5.5 | 5.3 | 5.6 | 5.6 | 5.6 | 6.3 | 5.5 | 5.6 | 5.6 | 5.6 |
| $TiO_2$ | 6.0 | 6.0 | 6.0 | 6.0 | 6.0 | 6.0 | 6.0 | 6.0 | 6.0 | 6.0 |
| $As_2O_3$ | 0.5 | 0.5 | 0.5 | 0.5 | 0.5 | 0.5 | 0.5 | 0.5 | 0.5 | 0.5 |
| Microwave Heatup | 113 | 78 | 93 | 99 | 60 | 48 | 72 | 52 | 63 | 50 |
| Thermal Expansion | 101.0 | 100.5 | 93.8 | 94.7 | 95.9 | 97.0 | 83.6 | 83.0 | 81.9 | 88.7 |

TABLE V-continued

|  | 1 | 2 | 3 | 4 | 5 | 6 | 7 | 8 | 9 | 10 |
|---|---|---|---|---|---|---|---|---|---|---|
| Ceram Distortion | 10.5 | 12 | 14 | 12 | 15.5 | 11 | 9 | 13.5 | 15 | 15 |
| Grain Size | f | f-m | f-m | f-m | f-m | f-m | f | f-m | f-m | f-m |
| Ceram Cracking | xxx | ok | xx | xxx | xxx | x | xxx | xx | xxx | xxx |
| Crystal Phase | N,C | N,C | N,C | N,C | N,C | N,C | N,C | N,C | N,C | N,C |

TABLE VI

|  | 1 | 2 | 3 | 4 | 5 | 6 | 7 | 8 |
|---|---|---|---|---|---|---|---|---|
| $SiO_2$ | 41.3 | 41.5 | 41.5 | 41.6 | 41.7 | 41.7 | 43.3 | 42.0 |
| $Al_2O_3$ | 30.9 | 29.6 | 29.6 | 31.1 | 31.1 | 31.2 | 30.9 | 31.3 |
| $Na_2O$ | 12.0 | 11.2 | 10.5 | 11.4 | 13.1 | 11.2 | 13.1 | 11.4 |
| $Li_2O$ | 0.83 | 0.75 | 0.75 | 0.21 | 0.42 | 0.42 | 0.50 | 0.63 |
| $K_2O$ | — | 1.6 | 2.6 | 2.15 | 1.6 | 1.8 | 1.3 | 1.1 |
| CaO | — | — | — | 1.6 | — | 1.6 | 1.6 | 1.6 |
| BaO | 8.5 | 8.5 | 8.5 | 5.5 | 5.6 | 5.5 | 2.7 | 5.6 |
| $TiO_2$ | 6.0 | 6.0 | 6.0 | 6.0 | 6.0 | 6.0 | 6.0 | 6.0 |
| $As_2O_3$ | 0.5 | 0.5 | 0.5 | 0.5 | 0.5 | 0.5 | 0.5 | 0.5 |
| Microwave Heatup | 85 | 55 | 42 | 58 | 94 | 52 | 58 | 59 |
| Thermal Expansion | — | 76.8 | 80.1 | 93.7 | 92.4 | 86.7 | 90.0 | 82.1 |
| Ceram Distortion | >20 | >20 | >20 | 14 | 10.5 | 16 | 13 | 15 |
| Grain Size | c | f-m | m-f | f-m | f-m | m-f | f-m | f-m |
| Ceram Cracking | ok | x | ok | ok | xxx | ok | ok | ok |
| Crystal Phase | N,C | N,C | N,C | N,C | N,C | N,C | N,(C) | N,C |

Perhaps the most sensitive determinant of efficient nucleation, and hence crystal control, is the $Al_2O_3/SiO_2$ ratio. Thus, in general, the moles of $Al_2O_3$ should exceed unity with $SiO_2$ in a range of 2.4 to 2.7 moles. For relatively fine grain size materials, as well as good microwave compatibility and moderate thermal expansion coefficient, a preferred composition range, in terms of relative moles of oxide, is 2.4–2.6 $SiO_2$, 1.03–1.15 $Al_2O_3$, 0.65–0.73 $Na_2O$, 0.13–0.20 BaO, 0.05–0.08 $Li_2O$ and 0.06–0.10 $K_2O$, the nucleant and fining agent being ignored.

I claim:

1. A glass-ceramic body in which the primary crystal phase is composed of nepheline crystals less than 20 microns in diameter, the body has a microwave compatibility value of less than 150° C., and the composition of the body, in percent by weight as calculated on an oxide basis, consists essentially of 30–55% $SiO_2$, 28–38% $Al_2O_3$, 5–12% $TiO_2$ as a nucleating agent, and 10–20% $R_2O$ ($Na_2O+K_2O+Li_2O$), each mole of $R_2O$ being composed of 0.65–0.95 moles $Na_2O$, 0.05–0.15 moles $Li_2O$ and 0–0.20 moles $K_2O$.

2. A glass-ceramic body in accordance with claim 1 wherein the body has a microwave compatibility of less than 100° C. and each mole of $R_2O$ contains 0.65–0.90 moles $Na_2O$ and 0.10–0.15 moles $Li_2O$.

3. A glass-ceramic body in which the primary crystal phase is composed of nepheline crystals less than 20 microns in diameter, the body has a microwave compatibility value of less than 150° C., and the composition of the body, is percent by weight as calculated on an oxide basis, consists essentially of 30–55% $SiO_2$, 28–38% $Al_2O_3$, 5–12% $TiO_2$ as a nucleating agent, and 10–20% $R_2O$ ($Na_2O+K_2O+Li_2O$), each mole of $R_2O$ being composed of 0.65–0.95 moles $Na_2O$, up to 0.20 moles $K_2O$ and up to 0.15 moles $Li_2O$, both $K_2O$ and $Li_2O$ being present and the total content being at least 0.05 moles.

4. A glass-ceramic body in accordance with claim 3 wherein the body has a microwave compatibility of less than 100° C. and each mole of $R_2O$ contains 0.65–0.90 moles $Na_2O$ and both $K_2O$ and $Li_2O$, the total content being at least 0.10 moles.

5. A glass-ceramic body in which the primary crystal phase is composed of nepheline crystals and there is a secondary celsian-type crystal phase with the crystals being not over 20 microns in diameter, the body has a microwave compatibility value below 100° C., has a thermal expansion coefficient of 80–95×$10^{-7}$/° C., and the composition of the body, in percent by weight as calculated on an oxide basis, consists essentially of 30–55% $SiO_2$, 28–38% $Al_2O_3$, 5–12% $TiO_2$ as a nucleating agent, 1–10% BaO, 0–3% $K_2O$, 0–1½% $Li_2O$, 10–18% $Na_2O$, 10–30% $R_2O$ ($Na_2O+K_2O+Li_2O$)+BaO, each mole of $R_2O+$BaO being composed of 0.50–0.80 moles $Na_2O$, 0–0.15 moles $Li_2O$, 0–0.20 moles $K_2O$, the total $Li_2O+K_2O$ being at least 0.10 moles, and 0.02–0.20 moles BaO.

6. A glass-ceramic body in accordance with claim 5 wherein the $TiO_2$ content is 5–7%.

7. A glass-ceramic body in accordance with claim 5 wherein the composition contains up to 5% CaO.

8. A glass-ceramic body in accordance with claim 5 wherein each mole of $R_2O+$BaO contains at least 0.05 moles each of $Li_2O$ and $K_2O$.

9. A glass-ceramic body in accordance with claim 8 wherein each mole of $R_2O+$BaO contains at least 0.10 moles BaO.

10. A glass-ceramic body in accordance with claim 5 wherein the moles of $Al_2O_3$ exceed unity with $SiO_2$ in the range of 2.4 to 2.7 moles.

11. A glass-ceramic body in accordance with claim 10 wherein the molar composition, exclusive of nucleant and fining agent, is 2.4–2.6 moles $SiO_2$, 1.03–1.15 moles $Al_2O_3$, 0.65–0.73 moles $Na_2O$, 0.13–0.20 moles BaO, 0.05–0.08 moles $Li_2O$, and 0.06–0.10 moles $K_2O$.

* * * * *